Dec. 30, 1952      M. FLADMARK      2,623,298
PROCESS FOR THE UTILIZATION OF GLUE WATER FROM HERRING OIL
AND FISH MEAL FACTORIES, WHALE STATIONS, AND THE LIKE
Filed Jan. 13, 1948
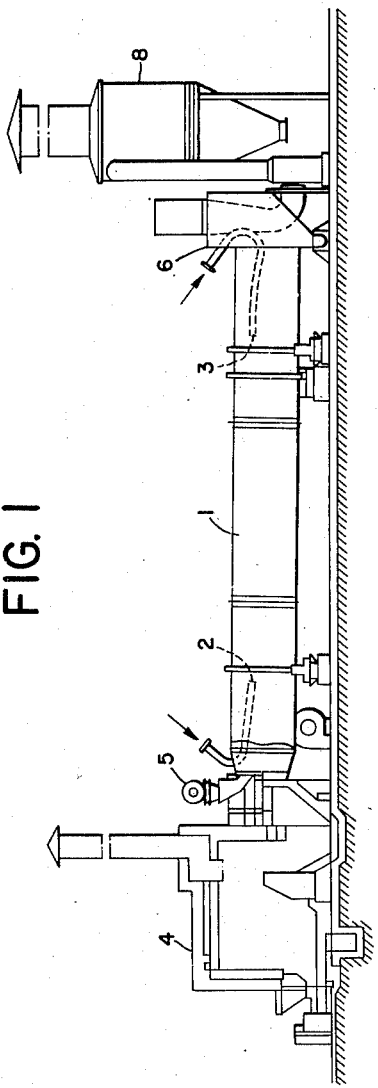
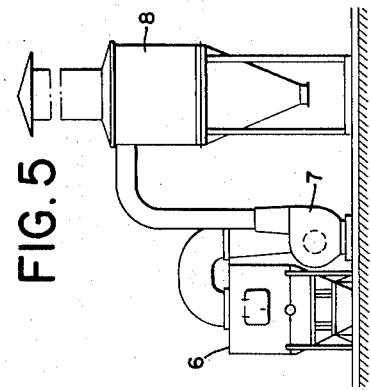
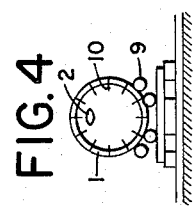
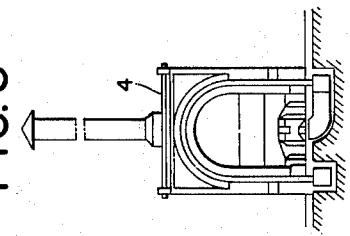
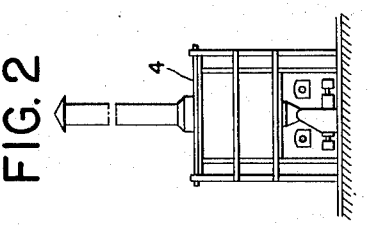
INVENTOR
MORTEN FLADMARK
BY Wenderoth, Lind & Ponack
ATTORNEYS Patented Dec. 30, 1952

2,623,298

UNITED STATES PATENT OFFICE 2,623,298

PROCESS FOR THE UTILIZATION OF GLUE WATER FROM HERRING OIL AND FISH MEAL FACTORIES, WHALE STATIONS, AND THE LIKE

Morten Fladmark, Oslo, Norway

Application January 13, 1948, Serial No. 2,088
In Norway January 15, 1947

1 Claim. (Cl. 34—9)

The present invention has for its object a process and apparatus for the evaporation and drying of "glue water" (also called "stick water" or "gelatinous water") obtained as an effluent liquid in connection with the manufacture of cattle food from sea animals, such as herrings and whales. The glue water contains only a few per cent of solids, so that a very large quantity of water has to be evaporated in order to obtain a dry, storable product therefrom. As a consequence of the large amounts of fuels required for such evaporation and drying, the cost of recovering the protein solids of this effluent liquid is very high.

According to the present invention a great saving of fuels for evaporation and drying is made possible by combining the evaporation and drying of the "glue water" with the conventional drying of heated or cooked raw material (herrings, whale meat and the like) after removing liquid ("glue water") therefrom by straining, pressing, centrifugal treatment and other mechanical means.

According to the invention the said glue water is atomized and introduced into a current of hot gaseous drying medium in the confined drying space of a rotating drying cylinder of comparatively great length above a constantly agitated continuous stream of disintegrated moist solid residuum from heated sea animal material, so as to cause the atomized glue water to be mixed with the said solids and to be dried together with same during its passage through the drying space.

An apparatus constructed to carry this process into effect will comprise in combination a heater or "cooker" for the raw material, mechanical means to separate liquid from the heated raw material, a rotating drying cylinder, means to pass a current of hot gaseous drying medium through the cylinder, and means for atomizing glue water and for introducing the atomized glue water into the interior of the drying cylinder, as well as means for introducing moist raw material into the cylinder at one end and for removing dried material at the other end thereof.

An apparatus adapted to carry out the process of the invention is diagrammatically illustrated in the accompanying drawings, in which the novel apparatus described herein is used in combination with a plant of the conventional type for the drying of press cake and like materials in herring and whale oil factories.

In the drawing:

Fig. 1 is a side view of the drier with furnace for the production of drying gases, flue hood and dust collector, Fig. 2 a front end view of the furnace,
Fig. 3 end view of the furnace, partly in section,
Fig. 4 sectional view of the drier,
Fig. 5 end view of flue hood and dust collector.

In the illustrated example hot combustion gases from a furnace 4 are supplied to the drum drier 1 at the inlet end of the drum where moist press cake is introduced.

An ordinary herring meal drier of the type illustrated in the drawing consists of a horizontally rotating drying cylinder of considerable length (up to about 15 meters) and having an interior diameter up to about 2 m.

The drying medium is in most cases combustion gases, having a temperature of several hundred degrees centigrade, which directly enter the drying chamber where they heat the disintegrated press cake material to be dried to form a meal. Owing to the vigorous evaporation, the temperature of the said combustion gases will rapidly decrease so that at the outlet end of the drier the temperature frequently is as low as about 70–100° C.

In the illustrated example herein, 1 is a drier drum, rotating on rollers 9 and having baffles 10 on its interior wall. Glue water is supplied to the interior drying space of the drum through pipes having atomizer nozzles 2, 3 at the outlet ends. The moist solid residuum to be dried is passed through a disintegrator ("tearer") 5, before it enters the drier 1. The moist gases from the drier escape through the hood 6 and enter a dust separator 8 (of the "cyclone" type). An exhaust ventilator 7 is inserted in the gas channel between hood 6 and cyclone 8.

The dried solids leave the drum 1 at the lower end thereof and are carried away by a suitable conveyer (not shown in the drawing).

The conventional drying cylinders on their interior surface are provided with longitudinally arranged angle irons, which in the course of the rotation of the drying cylinder will lift the charge and thereupon causing it to drop back, whereby the drying of the charge is facilitated.

Usually the drying apparatus of a factory is of a size adapted to effect drying of the usual amount of press cake leaving the press. If, however, the driers should be required to dry the press cake into which the glue water had been incorporated, the meal driers would in most cases prove to be too small, because the amount of meal from the dehydrated glue water will represent an addition of about 20 per cent in the output of meal.

When the glue water, however, is dried by atomization in the interior of the conventional herring meal drier as according to the present invention, the driers of the factories will be found to be large enough.

In an ordinary drier system it will usually be found that the entire amount of the drying air-combustion-gas-mixture will not be utilized, but will flow in an incompletely utilized state through the drier along the interior top part of the same, without having given off its drying completely to the charge.

By means of atomizing the glue water in the interior of the drier, practically the entire amount of drying air or gas will become utilized, so that the additional 20 per cent of meal output afforded by the glue water can be dried by means of practically the same amount of fuels as would otherwise be required only to dry the usual press cake to a meal.

The atomizing apparatus for the glue water, for example an atomizer nozzle, may be inserted in the inlet end of the drier, in which case the drying will take place in the same direction of flow as that of the press cake. The atomizer may, however, also be situated in the outlet end of the drying chamber, in which case the drying wholly or in part will take place in countercurrent to the press cake material.

Which method of operation is to be adopted in each particular instance will depend upon the concentration of the glue water, the temperature of the heating medium as well as other conditions of operation. For the same reason the atomizer nozzle may be placed immediately adjacent to the inlet or the outlet of the drying chamber, and it may be placed at any point in the drier between outlet and inlet.

The atomizer may be so arranged that the flow of the atomized glue water in part follows the direction of the flow of the press cake material and in part follows in countercurrent thereto.

In a so-called "through-fired" drier, the temperature at the inlet where the press cake material containing about 50 per cent of water meets the combustion gases, frequently is about 1000° C. during normal full production.

Owing to the intensive evaporation, the temperature decreases rapidly, so that about 3 m. from the inlet end it may be only about 300° C. Thereupon the temperature decreases comparatively uniformly towards the outlet end of the drier, where it may be about 100° C. or less.

The velocity of the air or gas flow in a rotating, directly fired meal drier may be quite considerable, so that it might be expected that the fine meal dust from the glue water would be drawn out of the drier. This is counteracted thereby that the glue water dust is taken up by the comparatively large amount of falling press cake material in the drying chamber.

In most cases the driers employed are also provided with a "cyclone" or dust collector, in which dust following the flow of gas is separated out.

The glue water may be completely dried to a solid powder through the atomization in the drying air current within the drier chamber; but it may in some instances be of advantage to subject the glue water in a preceding operation to a partial dehydration, in which case only the final drying is brought about together with the press cake material in order to obtain a most intimate mixture.

Because the glue water in this case has been previously dehydrated or dried, it will not have the capacity to adhere to the interior walls of the drier in the course of the drying operation.

In the drier illustrated in the drawing, press cake or other moist fish or whale material moves from the right to the left through the drier. Because the current of air moving through the interior upper part of the drier is not utilized or enters into contact with the material to be dried, it will be of advantage to cause the atomization to take place at this point. In this manner the amount of heat in the hot air, which is otherwise not fully utilized, will be made use of, and much extra fuel for the drying of the glue water to a solid condition will be saved.

The glue water, containing for example 5 per cent of solid matter, may be atomized in the condition in which it leaves the cooker or press, or it may have been subjected to a preceding concentration operation, for example to about 50–60 per cent of solids. Dependent upon the percentage of solids in the glue water, the atomization will be brought about either in parallel or in countercurrent as above explained.

I claim:

A process for the evaporation and drying of glue water from sea animals as raw materials to manufacture storable solid cattle food thereby, comprising, heating sea animal material, subjecting the heated material to a mechanical separation treatment to obtain on the one hand a moist solid residue and on the other hand a liquid, the so-called glue water, atomizing such glue water and introducing the atomized liquid into a current of a hot gaseous drying medium in a confined drying space above a stream of constantly agitated solid sea animal residue which material moves from one end to the other of said drying space, continuously introducing such moist solid residue into the said space at one end thereof, continuously removing solid dried sea animal material of evaporated and dried glue water at the other end of said drying space, continuously introducing hot gaseous drying medium at the inlet end of said drying space and continuously withdrawing moist gaseous medium from the opposite end of said space.

MORTEN FLADMARK.

REFERENCES CITED

The following references are of record in the file of this patent:

UNITED STATES PATENTS

| Number | Name | Date |
| --- | --- | --- |
| 958,902 | Brinkmann et al. | May 24, 1910 |
| 1,057,142 | Geiger | Mar. 25, 1913 |
| 1,232,032 | Haughey | July 3, 1917 |
| 1,421,283 | Meakin | June 27, 1922 |
| 1,708,705 | Nielsen | Apr. 9, 1929 |
| 1,731,457 | Fasting | Oct. 15, 1929 |
| 2,079,280 | Courch | May 4, 1937 |
| 2,156,845 | Gentele | May 2, 1939 |
| 2,168,626 | Newton | Aug. 8, 1939 |
| 2,363,281 | Arnold | Nov. 21, 1944 |
| 2,385,068 | Eshbaugh et al. | Sept. 18, 1945 |
| 2,386,052 | Lundy | Oct. 2, 1945 |